(12) United States Patent
Furusawa

(10) Patent No.: US 9,902,260 B2
(45) Date of Patent: Feb. 27, 2018

(54) FUEL TANK STRUCTURE

(71) Applicant: TOYOTA JIDOSHA KABUSHIKI KAISHA, Toyota-shi, Aichi (JP)

(72) Inventor: Takashi Furusawa, Toyota-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/759,482

(22) PCT Filed: Dec. 4, 2013

(86) PCT No.: PCT/JP2013/082636
§ 371 (c)(1),
(2) Date: Jul. 7, 2015

(87) PCT Pub. No.: WO2014/112236
PCT Pub. Date: Jul. 24, 2014

(65) Prior Publication Data
US 2015/0343899 A1    Dec. 3, 2015

(30) Foreign Application Priority Data

Jan. 15, 2013   (JP) .................................. 2013-004808

(51) Int. Cl.
*B60K 15/077*    (2006.01)
*B60K 15/03*     (2006.01)
(Continued)

(52) U.S. Cl.
CPC ...... *B60K 15/077* (2013.01); *B60K 15/03177* (2013.01); *B60K 2015/0344* (2013.01);
(Continued)

(58) Field of Classification Search
CPC .......... B60K 15/077; B60K 2015/0775; B60K 2015/0777; B60K 2015/0344; B60K 15/03177
See application file for complete search history.

(56) References Cited

U.S. PATENT DOCUMENTS 2,860,809 A * 11/1958 Perry ..................... B65D 90/52
                                                   137/574
4,143,193 A *  3/1979 Rees ...................... B29C 33/14
                                                   220/555
(Continued)

FOREIGN PATENT DOCUMENTS

EP       2319719 A1     5/2011
JP       S63-176720 U  11/1988
(Continued)

OTHER PUBLICATIONS

Dec. 1, 2015 Search Report issued in European Patent Application No. 13871967.9.

*Primary Examiner* — Andrew T Kirsch
(74) *Attorney, Agent, or Firm* — Oliff PLC

(57) ABSTRACT

A fuel tank structure is obtained that can prevent or suppress excessive stress concentrating at fixed portions of a separator and an inner wall of a fuel tank main body. A separator for reducing flow noise of fuel is disposed at an interior of a fuel tank that accommodates fuel. Projecting portions that serve as fixed portions that are fixed at two or more places to an inner wall of the fuel tank, are provided at the separator. Deformation portions that allow deformation of the separator are formed between the projecting portions at the separator.

9 Claims, 12 Drawing Sheets

(51) Int. Cl.
    *B60P 3/00*     (2006.01)
    *B62D 33/00*     (2006.01)
    *B65D 88/12*     (2006.01)
    *F02M 37/00*     (2006.01)

(52) U.S. Cl.
    CPC .......... *B60K 2015/0346* (2013.01); *B60K 2015/0775* (2013.01); *B60K 2015/0777* (2013.01); *F02M 37/0076* (2013.01)

(56) References Cited

U.S. PATENT DOCUMENTS

| | | | | |
|---|---|---|---|---|
| 5,887,616 | A * | 3/1999 | Ikeda | .......... B60K 15/061 116/227 |
| 6,138,859 | A | 10/2000 | Aulph et al. | |
| 7,878,360 | B2 * | 2/2011 | Takeda | .......... B29C 73/166 137/859 |
| 2009/0139994 | A1 | 6/2009 | Aoki et al. | |

FOREIGN PATENT DOCUMENTS

| | | |
|---|---|---|
| JP | H02-34443 U | 3/1990 |
| JP | H05-56553 U | 7/1993 |
| JP | H07-172195 A | 7/1995 |
| JP | 2003-170751 A | 6/2003 |
| JP | 2006-232132 A | 9/2006 |

\* cited by examiner

FUEL TANK STRUCTURE

TECHNICAL FIELD

The present invention relates to a fuel tank structure.

BACKGROUND ART

A structure, in which an annular baffle plate for reducing flow noise is fixed by spot welding to a tank bottom wall, is disclosed in Patent Document 1 (Japanese Utility Model Application Laid-Open (JP-U) No. H05-56553) as a fuel tank that is installed in an automobile. Note that, as a fuel tank, there is the structure disclosed in Patent Document 2 (Japanese Patent Application Laid-Open (JP-A) No. 2006-232132).

PRIOR ART DOCUMENTS

Patent Documents

[Patent Document 1] Japanese Utility Model Application Laid-Open (JP-U) No. H05-56553

[Patent Document 2] Japanese Patent Application Laid-Open (JP-A) No. 2006-232132

SUMMARY OF INVENTION

Technical Problem

However, in aforementioned Patent Document 1, in a case in which the tank bottom wall deforms due to, for example, load from the exterior or pressurizing deformation caused by vaporization of the fuel, if the baffle plate is a rigid body, there is the possibility that excessive stress will concentrate at the joined portions of the baffle plate and the tank bottom wall.

In consideration of the above-described circumstances, an object of the present invention is to obtain a fuel tank structure that can prevent or suppress excessive stress concentrating at fixed portions of a separator and an inner wall of a fuel tank main body.

Solution to Problem

A fuel tank structure of a first aspect of the present invention comprises: a fuel tank main body that accommodates fuel; a separator that is disposed at an interior of the fuel tank main body, and that is for reducing flow noise of the fuel; fixed portions that are provided at the separator, and that are fixed at two or more places to an inner wall of the fuel tank main body; and deformation portions that are formed between the fixed portions at the separator, and that allow deformation of the separator.

In a fuel tank structure of a second aspect of the present invention, in the fuel tank structure of the first aspect, the fixed portions are structured so as to be fixed to the inner wall of the fuel tank main body by fusing of resin.

In a fuel tank structure of a third aspect of the present invention, in the fuel tank structure of the first aspect or the second aspect, the deformation portions are formed at a wall portion of the separator, in directions that intersect lines that connect the fixed portions that are adjacent to one another.

In a fuel tank structure of a fourth aspect of the present invention, in the fuel tank structure of any one aspect of the first aspect through the third aspect, the deformation portions are made to be shapes that project-out in concave forms or convex forms from a wall surface that serves as a general portion of the separator.

In a fuel tank structure of a fifth aspect of the present invention, in the fuel tank structure of the fourth aspect, the deformation portions are structured by one or more concave portions and convex portions that are adjacently disposed.

In a fuel tank structure of a sixth aspect of the present invention, in the fuel tank structure of any one aspect of the first aspect through the fifth aspect, a plate thickness of the deformation portions is varied locally, or the deformation portions are made to be shapes in which an opening portion is provided locally.

In a fuel tank structure of a seventh aspect of the present invention, in the fuel tank structure of any one aspect of the first aspect through the fifth aspect, the deformation portions are formed from a rubber material.

In accordance with the fuel tank structure of the first aspect of the present invention, the separator that is for reducing flow noise of fuel is disposed at the interior of the fuel tank main body. The fixed portions at two or more places that are provided at the separator are fixed to the inner wall of the fuel tank main body. The deformation portions that allow deformation of the separator are formed between the fixed portions at the separator. Due thereto, even if the fuel tank main body deforms due to, for example, load from the exterior or pressurizing deformation caused by vaporization of fuel, due to the deformation portions, that are formed between the fixed portions at the separator, deforming, excessive stress concentrating at the fixed portions that are fixed to the inner wall of the fuel tank main body can be prevented or suppressed.

In accordance with the fuel tank structure of the second aspect of the present invention, the fixed portions are fixed to the inner wall of the fuel tank main body by fusing of resin. Due thereto, due to the deformation portions deforming in accordance with the deformation of the fuel tank main body, excessive stress concentrating at the portions fused to the inner wall of the fuel tank main body can be prevented or suppressed.

In accordance with the fuel tank structure of the third aspect of the present invention, the deformation portions are formed at the wall portion of the separator, in directions intersecting lines that connect fixed portions that are adjacent to one another. Due thereto, even if the distance between fixed portions that are adjacent to one another varies due to deformation of the fuel tank main body, the deformation portions between the fixed portions deform in accordance with the deformation of the fuel tank main body. Therefore, excessive stress concentrating at the fixed portions can be prevented or suppressed more effectively.

In accordance with the fuel tank structure of the fourth aspect of the present invention, the deformation portions are made to be shapes that project-out in concave forms or convex forms from the wall surface that serves as the general portion of the separator. Therefore, it is easy for the concave or convex regions to deform in directions of opening and in directions of narrowing, in accordance with the deformation of the fuel tank main body.

In accordance with the fuel tank structure of the fifth aspect of the present invention, the deformation portions are structured by one or more concave portions and convex portions that are disposed adjacent. Therefore, it is easy for the concave portions and the convex portions to deform in accordance with the deformation of the fuel tank main body.

In accordance with the fuel tank structure of the sixth aspect of the present invention, the plate thickness of the deformation portions is varied locally, or the deformation portions are made to be shapes in which an opening portion is provided locally. Due thereto, the deformation portion can easily deform more reliably in accordance with the deformation of the fuel tank main body.

In accordance with the fuel tank structure of the seventh aspect of the present invention, the deformation portions are formed from a rubber material. Due thereto, it is easy for the deformation portions to deform so as to expand and contract, in accordance with the deformation of the fuel tank main body.

Advantageous Effects of Invention

In accordance with the fuel tank structure relating to the present invention, excessive stress concentrating at fixed portions of a separator and an inner wall of a fuel tank main body can be prevented or suppressed.

DESCRIPTION OF EMBODIMENTS

A first embodiment of a fuel tank structure relating to the present invention is described hereinafter by using FIG. 1A through FIG. 4.

Figure 1A:
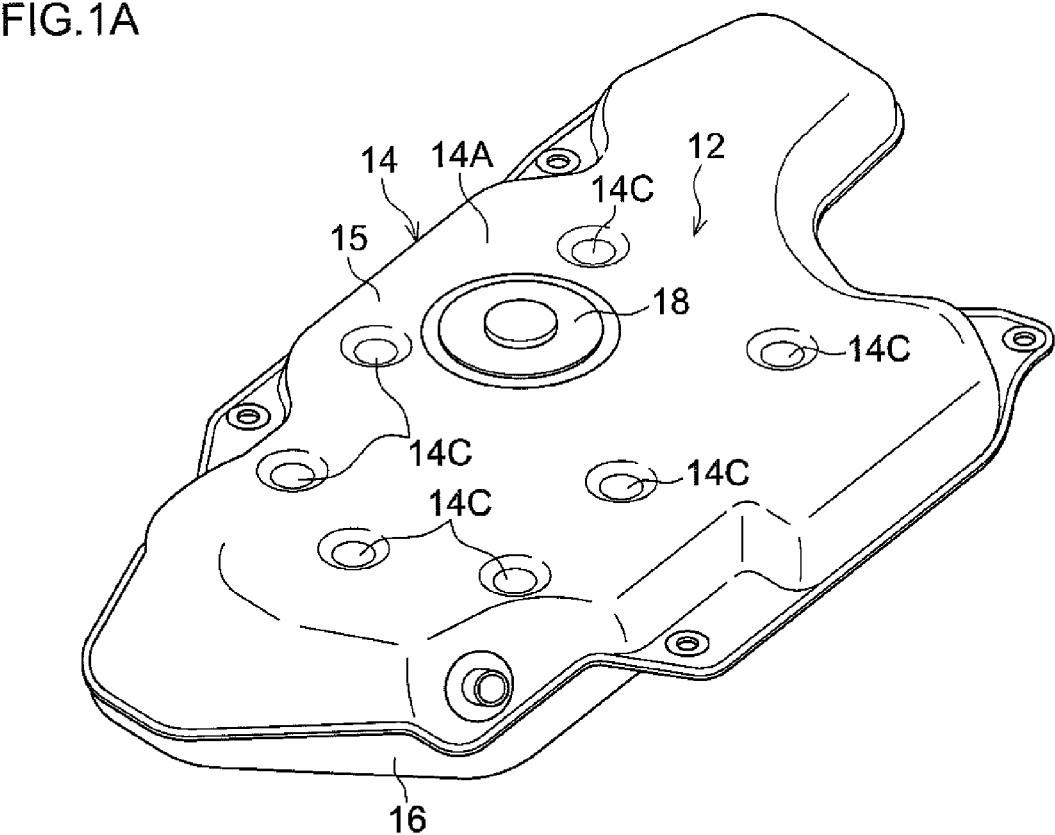
FIG. 1A is a perspective view showing a fuel tank main body that is used in a fuel tank structure of a first embodiment of the present invention.
Figure 1B:
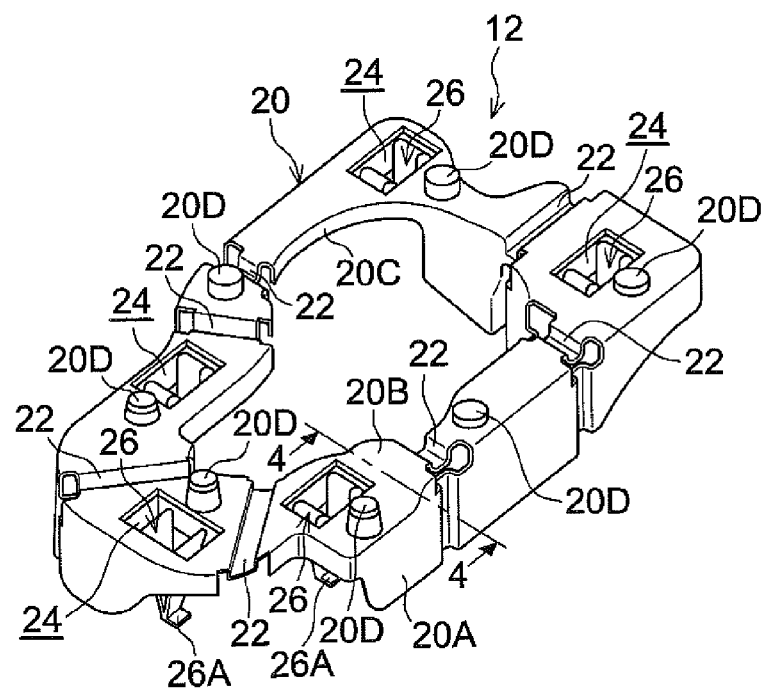
FIG. 1B is a perspective view showing a separator that is used in the fuel tank structure of the first embodiment of the present invention.
Figure 2:
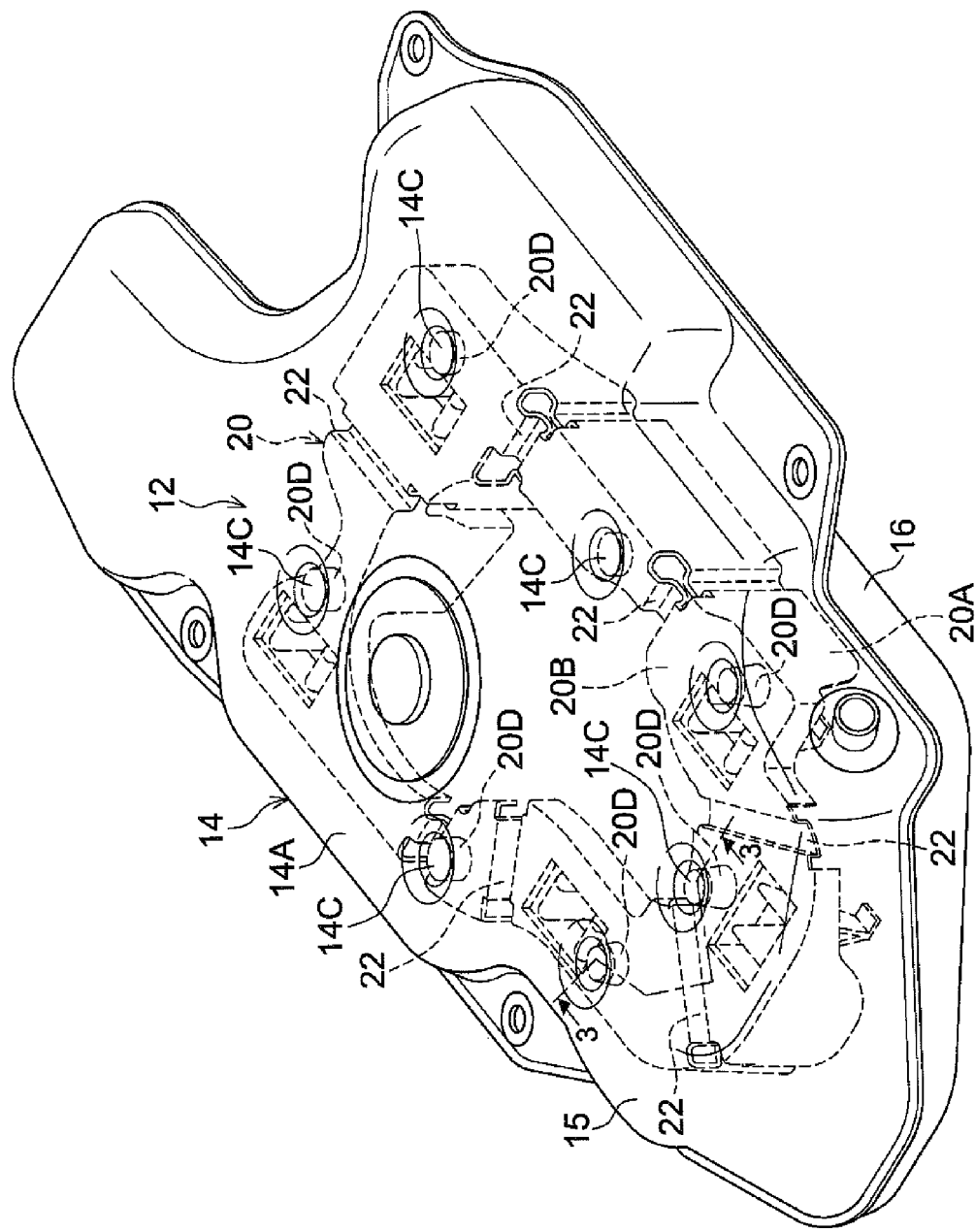
FIG. 2 is a perspective view showing a state in which the separator is accommodated at the interior of the fuel tank main body that is used in the fuel tank structure shown in FIG. 1A.

A fuel tank 14 that is used in a fuel tank structure 12 of the first embodiment is shown in FIG. 1A. A separator 20 that is used in the fuel tank structure 12 of the first embodiment is shown in FIG. 1B. A state, in which the separator 20 is accommodated at the interior of the fuel tank 14, is shown in FIG. 2. As shown in FIG. 1A and FIG. 2, this fuel tank structure 12 has the fuel tank 14 that serves as a fuel tank main body and that is disposed beneath the floor panel (not shown) of a vehicle body. As an example, the fuel tank 14 is formed from a container that is flat vertically, and can accommodate fuel at the interior thereof. In the present embodiment, the fuel tank 14 is structured as a container that is vertically integral due to the peripheral edge portions of a tank portion 15 at the upper side and a tank portion 16 at the lower side being joined. In the present embodiment, the fuel tank 14 is made of resin.

As shown in FIG. 2, the separator 20 is accommodated (incorporated) in the interior of the fuel tank 14 (see FIG. 1B). The separator 20 is formed in a substantially annular shape as seen in plan view, and flowing of fuel within the fuel tank 14 is suppressed by the separator 20. Due thereto, the occurrence of flow noise of the fuel within the fuel tank 14 is reduced.

Further, although not illustrated, a fuel pump is accommodated at the central portion of the separator 20 within the fuel tank 14. Fuel is sent-out to an engine due to the driving of this fuel pump. A cap portion 18 for closing the fuel tank 14 is provided at the upper side of the fuel pump (not shown), at a top surface portion 14A of the fuel tank 14. A pipe (not shown) for sending the fuel within the fuel tank 14 out to the engine is connected to the cap portion 18.

Figure 4:
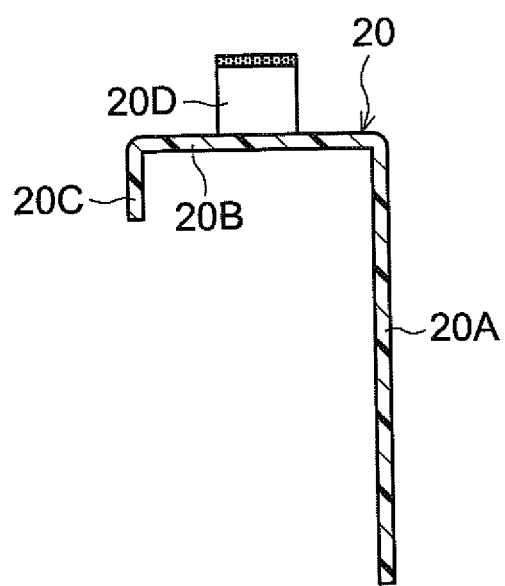
FIG. 4 is a vertical sectional view showing the separator along line 4-4 in FIG. 1B.

As shown in FIG. 1B and FIG. 2, the separator 20 is formed by locally bending a plate-shaped member. As shown in FIG. 4, for example, the separator 20 has an outer side vertical wall portion (wall portion) 20A that is disposed substantially along the vertical direction at the tank transverse direction outer side, and a top surface portion (wall portion) 20B that extends in a lateral direction toward the tank transverse direction inner side from the upper end portion of the outer side vertical wall portion 20A. Moreover, the separator 20 has an inner side vertical wall portion (wall portion) 20C that extends toward the lower side from the tank transverse direction inner side end portion of the top surface portion 20B. As shown in FIG. 1B and the like, the separator 20 is structured such that the lengths of the outer side vertical wall portion 20A and the top surface portion 20B and the inner side vertical wall portion 20C respectively differ depending on the position of the region of the substantially annular shape. Namely, FIG. 4 is an example of a vertical cross-sectional view of the separator 20, and the vertical cross-sectional view differs in accordance with the position of the region of the substantially annular shape of the separator 20.

As shown in FIG. 1A through FIG. 4, projecting portions 20D, that serve as fixed portions for fixing the separator 20 to an inner wall 14B of the top surface portion 14A of the fuel tank 14, are formed at the top surface portion 20B of the separator 20. In the present embodiment, the projecting portions 20D are formed in substantially solid cylindrical shapes, and are formed so as to project-out toward the upper side from the top surface portion 20B. The top surfaces of the projecting portions 20D are formed to be substantially planar. The plural projecting portions 20D are provided with intervals therebetween at the top surface portion 20B. It is preferable that the projecting portions 20D are provided at two or more places, and, in the present embodiment, the projecting portions 20D are provided at seven places.

In the present embodiment, recessed portions 14C, that are recessed in concave forms from the top surface portion 14A, are formed in the top surface portion 14A of the fuel tank 14. In the present embodiment, the recessed portions 14C are substantially circular as seen in plan view, and are crater-shaped. Further, in the present embodiment, the separator 20 is formed of resin, and the top surfaces of the projecting portions 20D are fixed by fusing to bottom surfaces (the inner wall 14B) of the recessed portions 14C of the fuel tank 14 that is made of resin. Although not illustrated, it is preferable to form plural minute indentations in the top surfaces of the projecting portions 20D in order to improve the fusibility with the bottom surfaces of the recessed portions 14C.

Further, as shown in FIG. 1B, opening portions 24 that are substantially rectangular as seen in plan view are formed in the top surface portion 20B of the separator 20. The plural (five in the present embodiment) opening portions 24 are formed in predetermined positions of the top surface portion 20B. Mounting portions 26 that are formed in substantial U-shapes are mounted to vertical walls at the peripheries of the opening portions 24. Namely, the pair of upper end portions of the mounting portion 26 that is formed in a substantial U-shaped are fixed by fusing or the like to vertical walls at the periphery of the opening portion 24. A fixed portion 26A, whose bottom surface is formed to be substantially planar, is formed at the lower end portion of the mounting portion 26. Although not illustrated, the fixed portions 26A of the mounting portions 26 are fixed by fusing to the inner wall of the bottom surface portion of the tank portion 16 at the lower side of the fuel tank 14. Due to the mounting portions 26 being formed in substantial U shapes, the fixed portion 26A sides thereof can deform in the substantially vertical direction with respect to the positions of mounting to the opening portions 24, in accordance with the deformation of the fuel tank 14.

As shown in FIG. 1A through FIG. 3, deformation portions 22 that allow deformation of the separator 20 itself are formed between the projecting portions 20D that are adjacent to one another at the separator 20. The deformation portion 22 is structured by a concave portion that is recessed in a concave form from the wall surface (e.g., the top surface portion 20B) that serves as the general portion of the separator 20. Concretely, the deformation portion 22 has an inclined portion 22A that is disposed at an incline so as to become narrower toward the lower side from the top surface portion 20B that serves as the wall surface, and a bottom surface portion 22B that is formed at the end portion of the inclined portion 22A (see FIG. 3).

The deformation portion 22 is formed in the shape of a groove in a direction intersecting a line that connects the projecting portions 20D that are adjacent to one another of the separator 20. Namely, the direction that runs along the bottom surface portion 22B of the deformation portion 22 is disposed in a direction that intersects a line that connects the projecting portions 20D that are adjacent to one another of the separator 20. Further, between the projecting portions 20D that are adjacent, the deformation portion 22 is formed so as to extend over the outer side vertical wall portion 20A and the top surface portion 20B and the inner side vertical wall portion 20C of the separator 20. In other words, the deformation portion 22 is disposed so as to cross from edge portion to edge portion of the outer side vertical wall portion 20A and the top surface portion 20B and the inner side vertical wall portion 20C of the separator 20. At the position where the deformation portion 22 is provided, a cut-out or an opening is formed in the corner portion of the outer side vertical wall portion 20A and the top surface portion 20B of the separator 20, and in the corner portion of the top wall portion 20B and the inner side vertical wall portion 20C.

There are cases in which the fuel tank 14 deforms due to thermal contraction after installation in the vehicle, deformation due to expansion of the fuel toward the tank material, pressurizing deformation due to vaporization of the fuel, or load from the exterior. In this case, due to the deformation portions 22 being formed between the projecting portions 20D that are adjacent to one another of the separator 20, the deformation portions 22 of the separator 20 deform in accordance with the deformation of the fuel tank 14. Namely, even if the distance between the projecting portions 20D that are adjacent to one another changes due to deformation of the fuel tank 14, the deformation portions 22, that are formed from concave portions as seen in the cross-section shown in FIG. 3, deform in directions of opening and in directions of narrowing, following the deformation of the fuel tank 14.

Here, explanation is given of the method of accommodating (placing) the separator 20 in the fuel tank 14. First, the separator 20 that is, made of resin is manufactured. Thereafter, the fuel tank 14 is manufactured by blow molding a resin material. At this time, the top surfaces of the projecting portions 20D of the separator 20 are fixed to the inner wall 14B of the fuel tank 14 by fusing.

In such a manufacturing method, there is the possibility that, after the blow molding, the fuel tank 14 will deform due to thermal contraction. In this case as well, the deformation portions 22 that are formed from concave portions deform in directions of opening and in directions of narrowing, following the deformation of the fuel tank 14.

Operation and effects of the fuel tank structure 12 of the present embodiment are described next.

There are cases in which the fuel tank 14 deforms due to thermal contraction after installation in the vehicle, deformation due to expansion of the fuel, pressurizing deformation due to vaporization of the fuel, or load from the exterior. Further, there are also cases in which, after the blow molding at the time of manufacturing the fuel tank 14, the fuel tank 14 deforms due to thermal contraction. The projecting portions 20D of the separator 20D are respectively fixed by fusing to the inner wall 14B of the plural recessed portions 14C of the fuel tank 14. In this case, due to the deformation portions 22 being formed between the projecting portions 20D that are adjacent to one another at the separator 20, the deformation portions 22 of the separator 20 deform in accordance with the deformation of the fuel tank 14. For example, even if the distance between the projecting portions 20D that are adjacent to one another changes due to deformation of the fuel tank 14, the deformation portions 22 that are concave deform in directions of opening and in directions of narrowing, in accordance with the distance between the projecting portions 20D, and deformation of the fuel tank 14 is thereby absorbed.

Due thereto, when the fuel tank 14 deforms, excessive stress concentrating at the fixed portions (the fused portions) of the inner wall 14B of the fuel tank 14 and the projecting portions 20D of the separator 20 can be prevented or suppressed.

There has conventionally been proposed a structure in which, for example, fuse-shaped portions are set at the positions of fixing of the fuel tank and the separator, and when the deformation of the fuel tank is greater than a predetermined amount, breakage of the fuel tank that is the base material is avoided due to the fuse-shaped portions breaking. However, in such a structure, the shape of the fused-shaped portions is complex, and a complicated mold design is needed in order to manufacture the fuse-shaped portions, and there is the possibility that costs will increase.

In contrast, in the fuel tank structure 12 of the present embodiment, due to the deformation portions 22 deforming following the deformation of the fuel tank 14, excessive stress concentrating at the fixed portions (the fused portions) of the inner wall 14B of the fuel tank 14 and the projecting portions 20D of the separator 20 can be prevented or suppressed. Therefore, it is possible to avoid a complicated mold design, and a decrease in costs is possible.

Note that, in the above-described first embodiment, the fuel tank 14 that is made of resin and the separator 20 that is made of resin are used, and the projecting portions 20D of the separator 20 are fixed by fusing to the inner wall 14B of the fuel tank 14. However, the first embodiment is not limited to this. For example, a fuel tank 14 that is made of resin and a separator 20 that is made of metal (a steel plate or the like) may be used, and only the projecting portions 20D may be made of resin and fixed by adhesion or the like to the separator 20, and the projecting portions 20D may be fixed by fusing to the inner wall 14B of the fuel tank 14. Further, for example, there may be a structure in which the fuel tank 14 that is made of metal and the separator 20 that is made of metal are used, and the projecting portions 20D are joined to the inner wall of the fuel tank 14 by welding or the like.

A second embodiment of the fuel tank structure relating to the present invention is described next by using FIG. 5. Note that structural portions that are the same as those of the above-described first embodiment are denoted by the same numbers, and description thereof is omitted.

Figure 5:
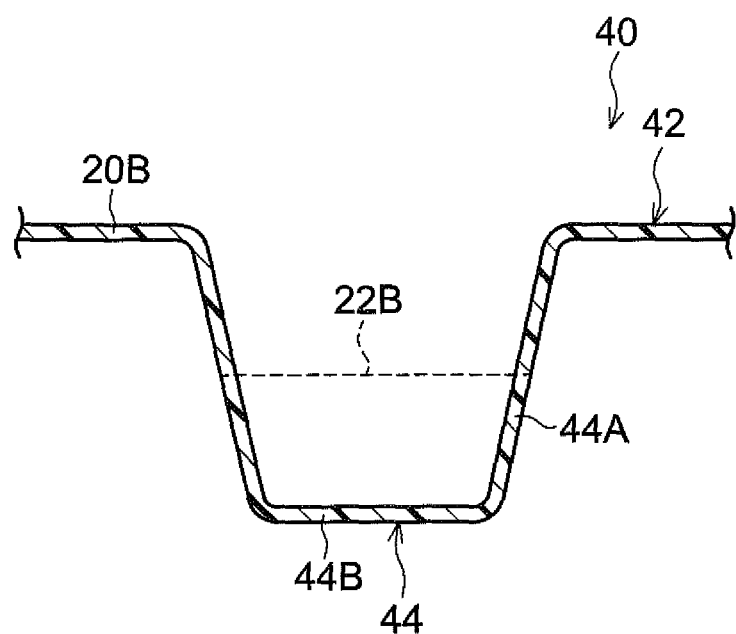
FIG. 5 is a cross-sectional view showing a deformation portion of a separator that is used in a fuel tank structure of a second embodiment of the present invention.

A vicinity of a deformation portion 44 of a separator 42 that is used in a fuel tank structure 40 of the second embodiment is shown in FIG. 5 in a cross-sectional view. As shown in FIG. 5, the deformation portion 44, that is formed from a concave portion that is recessed in a concave form, is formed at a wall surface (the top surface portion 20B in FIG. 5) that serves as the general portion of the separator 42. Concretely, the deformation portion 44 has an inclined portion 44A that is disposed at an incline so as to become narrower toward the lower side from the top surface portion 20B, and a bottom surface portion 44B that is formed at the end portion of the inclined portion 44A. Namely, the depth of the bottom surface portion 44B of the deformation portion 44 is formed to be deeper than the depth of the bottom surface portion 22B of the deformation portion 22 of the first embodiment (refer to the dotted line in FIG. 5). Note that, although not illustrated, the positions at which the deformation portions 44 of the separator 42 are provided are set to be substantially the same as the positions of the deformation portions 22 (see FIG. 1B) of the separator 20 of the first embodiment, and the deformation portions 44 are formed in the shapes of grooves in the wall surface of the separator 42.

In this fuel tank structure 40, due to the depth of the bottom surface portion 44B of the deformation portion 44 being formed to be deeper than the bottom surface portion 22B of the deformation portion 22 of the first embodiment, the deformation portions 44 deform more easily in directions of opening and in directions of narrowing. Therefore, due to the deformation portions 44 deforming in directions of opening and in directions of narrowing following the deformation of the fuel tank 14 (see FIG. 1A), excessive stress concentrating at the fixed portions (the fused portions) of the inner wall 14B of the fuel tank 14 and the projecting portions 20D of the separator 42 can be prevented or suppressed (see FIG. 3).

Note that, in the first and second embodiments, in a case in which there is leeway in terms of space between the separator and the fuel tank, deformation portions, that are formed from convex portions that project-out from the wall surface of the separator in the opposite direction of the deformation portions 22, 44, may be provided. Further, the depth (height) and the width of the deformation portions are not limited to those of the above-described first and second embodiments, and can be changed.

A third embodiment of the fuel tank structure relating to the present invention is described next by using FIG. 6. Note that structural portions that are the same as those of the above-described first and second embodiments are denoted by the same numbers, and description thereof is omitted.

Figure 6:
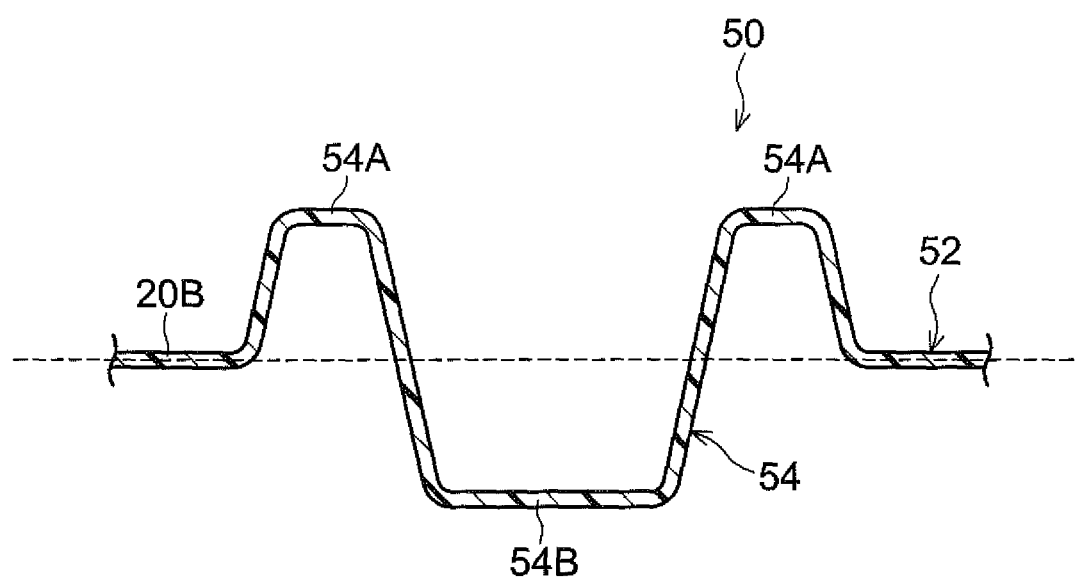
FIG. 6 is a cross-sectional view showing a deformation portion of a separator that is used in a fuel tank structure of a third embodiment of the present invention.

A vicinity of a deformation portion 54 of a separator 52 that is used in a fuel tank structure 50 of the third embodiment is shown in FIG. 6 in a cross-sectional view. As shown in FIG. 6, the deformation portion 54 has two mountain portions 54A that serve as convex portions that project-out upward from the wall surface (the top surface portion 20B in FIG. 6) that serves as the general portion of the separator 52, and a valley portion 54B that serves as a concave portion that is recessed downward between the two mountain portions 54A. The mountain portions 54A are shaped such that the widths thereof gradually become more narrow toward the projecting-out direction. The valley portion 54B is formed to be larger than the width of the mountain portions 54A, and is shaped such that the width thereof gradually becomes more narrow toward the direction of being recessed. Note that, although not illustrated, the positions at which the deformation portions 54 of the separator 52 are provided are set to be substantially the same as the positions of the deformation portions 22 (see FIG. 1B) of the separator 20 of the first embodiment. (Note that the positions are set the same also in the embodiments that are described hereinafter.)

In this fuel tank structure 50, the deformation portions 54 that have the two mountain portions 54A and the valley portion 54B therebetween are provided, and the mountain portions 54A and the valley portion 54B easily deform in directions of opening and directions of narrowing. Therefore, due to the deformation portions 54 deforming following the deformation of the fuel tank 14 (see FIG. 1A), excessive stress concentrating at the fixed portions (the fused portions) of the inner wall 14B of the fuel tank 14 and the projecting portions 20D of the separator 52 can be prevented or suppressed (see FIG. 3).

A fourth embodiment of the fuel tank structure relating to the present invention is described next by using FIG. 7. Note that structural portions that are the same as those of the above-described first through third embodiments are denoted by the same numbers, and description thereof is omitted.

Figure 7:
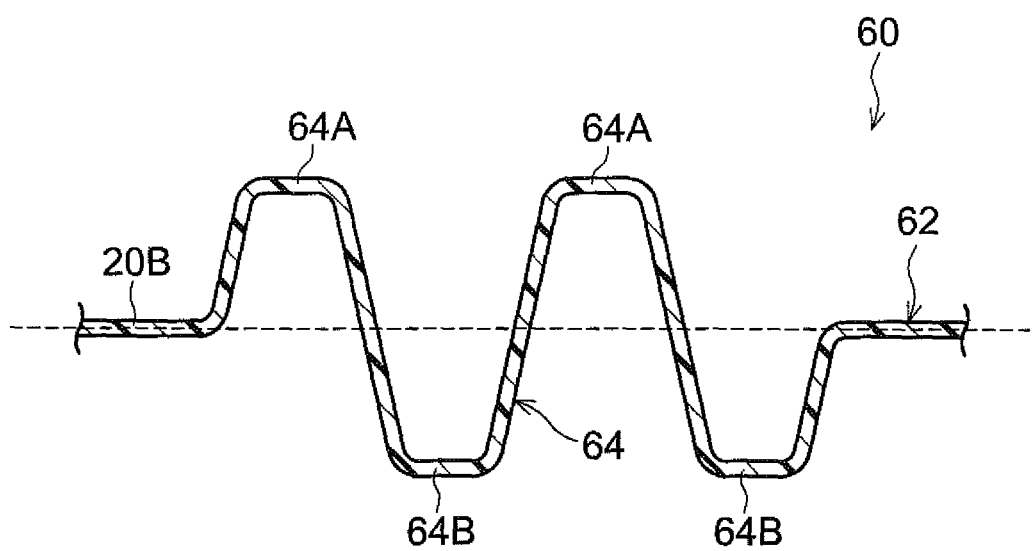
FIG. 7 is a cross-sectional view showing a deformation portion of a separator that is used in a fuel tank structure of a fourth embodiment of the present invention.

A vicinity of a deformation portion 64 of a separator 62 that is used in a fuel tank structure 60 of the fourth embodiment is shown in FIG. 7 in a cross-sectional view. As shown in FIG. 7, at the deformation portion 64, mountain portions 64A that serve as convex portions that project-out upward from the wall surface (the top surface portion 20B in FIG. 7) that serves as the general portion of the separator 62, and valley portions 64B that serve as concave portions that are recessed downward, are disposed alternately. In the present embodiment, two of the mountain portions 64A and two of the valley portions 64B are provided. The mountain portions 64A are shaped such that the widths thereof gradually become more narrow toward the projecting-out direction, and the valley portions 64B are shaped such that the widths thereof gradually become more narrow toward the direction of being recessed.

In this fuel tank structure 60, the deformation portions 64, at which the mountain portions 64A and the valley portions 64B are disposed alternately, are provided, and the mountain portions 64A and the valley portion 64B easily deform in directions of opening and directions of narrowing. Therefore, due to the deformation portions 64 deforming following the deformation of the fuel tank 14 (see FIG. 1A), excessive stress concentrating at the fixed portions (the fused portions) of the inner wall 14B of the fuel tank 14 and the projecting portions 20D of the separator 62 can be prevented or suppressed (see FIG. 3).

Note that, in the present embodiment, the numbers, the widths and the heights of the mountain portions 64A and the valley portions 64B may be changed. Further, if there is leeway in terms of space between the projecting portions 20D (see FIG. 1B) that are adjacent to one another of the separator, deformation portions that are bellows-shaped may be provided.

A fifth embodiment of the fuel tank structure relating to the present invention is described next by using FIG. 8. Note that structural portions that are the same as those of the above-described first through fourth embodiments are denoted by the same numbers, and description thereof is omitted.

Figure 8:
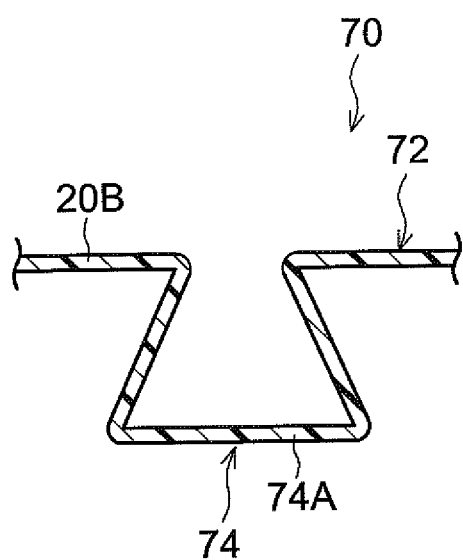
FIG. 8 is a cross-sectional view showing a deformation portion of a separator that is used in a fuel tank structure of a fifth embodiment of the present invention.

A vicinity of a deformation portion 74 of a separator 72 that is used in a fuel tank structure 70 of the fifth embodiment is shown in FIG. 8 in a cross-sectional view. As shown in FIG. 8, the deformation portion 74 has a concave portion 74A that is recessed downward from the wall surface (the top surface portion 20B in FIG. 8) that serves as the general portion of the separator 72. The concave portion 74A is shaped such that the width thereof gradually widens toward the direction of being recessed. The width of the bottom surface portion of the concave portion 74A is set to be larger than the width of the upper end portion thereof. Namely, as seen in cross section, the corner portions of the concave portion 74A are acute angles. The concave portion 74A is formed by negative angle molding.

In this fuel tank structure 70, the deformation portion 74 that has the concave portion 74A is provided, and it is easy for the deformation portion 74 to deform in directions of opening and directions of narrowing. Therefore, due to the deformation portions 74 deforming following the deformation of the fuel tank 14 (see FIG. 1A), excessive stress concentrating at the fixed portions (the fused portions) of the inner wall 14B of the fuel tank 14 and the projecting portions 20D of the separator 72 can be prevented or suppressed (see FIG. 3).

Note that, in the present embodiment, the depth and the width of the deformation portion 74 can be changed. Further, in a case in which there is leeway in terms of space between the separator and the fuel tank, deformation portions, that are formed from convex portions that project-out from the wall surface of the separator, may be provided instead of the deformation portions 74 of the present embodiment.

A sixth embodiment of the fuel tank structure relating to the present invention is described next by using FIG. 9. Note that structural portions that are the same as those of the above-described first through fifth embodiments are denoted by the same numbers, and description thereof is omitted.

Figure 9:
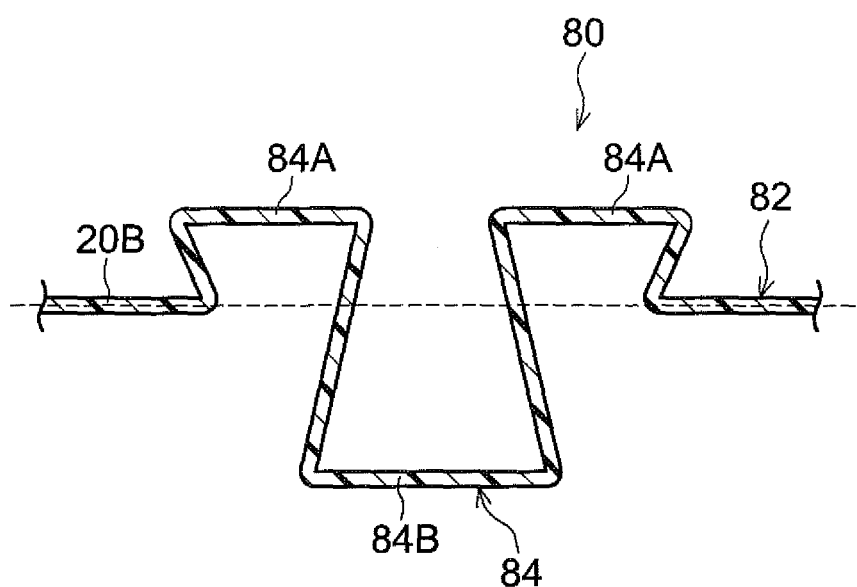
FIG. 9 is a cross-sectional view showing a deformation portion of a separator that is used in a fuel tank structure of a sixth embodiment of the present invention.

A vicinity of a deformation portion 84 of a separator 82 that is used in a fuel tank structure 80 of the sixth embodiment is shown in FIG. 9 in a cross-sectional view. As shown in FIG. 9, the deformation portion 84 has two convex portions 84A that project-out upward from the wall surface (the top surface portion 20B in FIG. 9) that serves as the general portion of the separator 82, and a concave portion 84B that is recessed downward between the two convex portions 84A. The convex portions 84A are shaped such that the widths thereof gradually widen toward the projecting-out direction. The concave portion 84B is shaped such that the width thereof gradually widens toward the direction of being recessed. The convex portions 84A and the concave portion 84B are formed by negative angle molding.

In this fuel tank structure 80, the deformation portions 84, that are provided with the two convex portions 64A and the concave portion 84B therebetween, are provided, and the convex portions 84A and the concave portion 84B easily deform in directions of opening and directions of narrowing. Therefore, due to the deformation portions 84 deforming following the deformation of the fuel tank 14 (see FIG. 1A), excessive stress concentrating at the fixed portions (the fused portions) of the inner wall 14B of the fuel tank 14 and the projecting portions 20D of the separator 82 can be prevented or suppressed (see FIG. 3).

Note that, in the present embodiment, the depths and the widths of the convex portions 84A and the concave portion 84B can be changed.

A seventh embodiment of the fuel tank structure relating to the present invention is described next by using FIG. 10. Note that structural portions that are the same as those of the above-described first through sixth embodiments are denoted by the same numbers, and description thereof is omitted.

Figure 10:
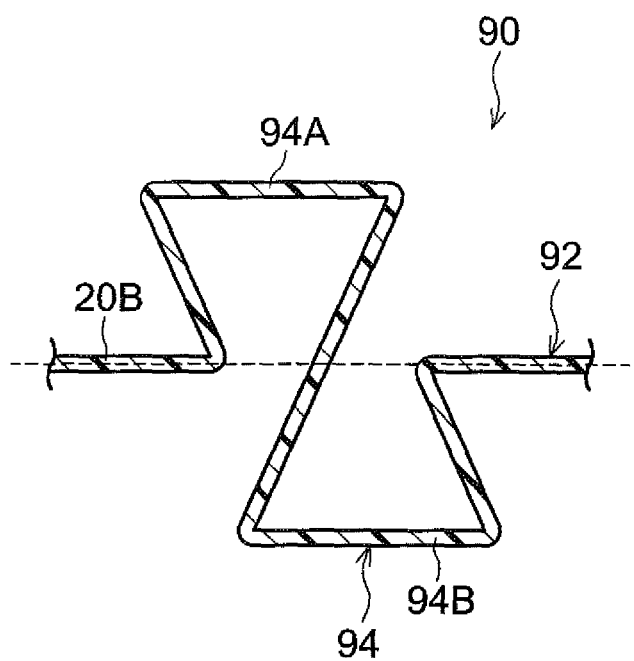
FIG. 10 is a cross-sectional view showing a deformation portion of a separator that is used in a fuel tank structure of a seventh embodiment of the present invention.

A vicinity of a deformation portion 94 of a separator 92 that is used in a fuel tank structure 90 of the seventh embodiment is shown in FIG. 10 in a cross-sectional view. As shown in FIG. 10, the deformation portion 94 has a convex portion 94A that projects-out upward from the wall surface (the top surface portion 20B in FIG. 10) that serves as the general portion of the separator 92, and a concave portion 94B that is recessed downward. The convex portion 94A is shaped such that the width thereof gradually widens toward the projecting-out direction, and the concave portion 94B is shaped such that the width thereof gradually widens toward the direction of being recessed. Namely, the convex portion 94A and the concave portion 94B are formed by negative angle molding.

In this fuel tank structure 90, the deformation portions 94, that are provided with the convex portion 94A and the concave portion 94B, are provided, and the convex portion 94A and the concave portion 94B easily deform in directions of opening and directions of narrowing. Therefore, due to the deformation portions 94 deforming following the deformation of the fuel tank 14 (see FIG. 1A), excessive stress concentrating at the fixed portions (the fused portions) of the inner wall 14B of the fuel tank 14 and the projecting portions 20D of the separator 92 can be prevented or suppressed (see FIG. 3).

Note that, in the present embodiment, the widths and the heights of the convex portion 94A and the concave portion 94B may be changed. Further, the numbers of the convex portion 94A and the concave portion 94B can be changed, and there may be a structure in which the convex portions 94A and the concave portions 94B are disposed alternately.

Note that, in the above-described first through seventh embodiments, the plate thickness of the separator is constant. However, the embodiments are not limited to this, and, for example, the plate thickness of the deformation portions may be varied at some portions with respect to other regions. For example, the plate thickness in the vicinities of the corner portions of the deformation portions may be made to be thinner than the plate thickness of the other regions, or the plate thickness of the planar portion between the corner portion and the corner portion may be made to be thinner than the plate thickness of the corner portions. By making the plate thickness of the deformation portion thin locally, the deformation portion can be deformed into a shape that is targeted in advance.

An eighth embodiment of the fuel tank structure relating to the present invention is described next by using FIG. 11. Note that structural portions that are the same as those of the above-described first through seventh embodiments are denoted by the same numbers, and description thereof is omitted.

Figure 11:
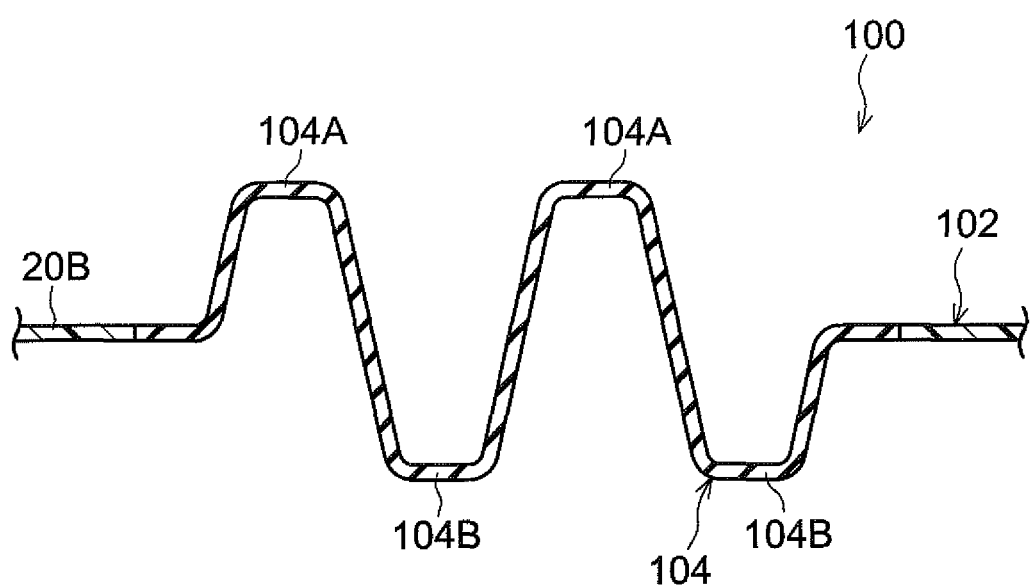
FIG. 11 is a cross-sectional view showing a deformation portion of a separator that is used in a fuel tank structure of an eighth embodiment of the present invention.

A vicinity of a deformation portion 104 of a separator 102 that is used in a fuel tank structure 100 of the eighth embodiment is shown in FIG. 11 in a cross-sectional view. As shown in FIG. 11, deformation portions 104, at which portions are formed from a rubber material, are provided at the wall portion (the top surface portion 20B in FIG. 11) of the separator 102 that is made of resin. At the deformation portion 104, mountain portions 104A that serve as convex portions that project-out upward, and valley portions 104B that serve as concave portions that are recessed downward, are formed alternately. The deformation portions 104 are formed by two-color molding at the wall portion of the separator 102. Here, two-color molding means a method of molding in which two types of materials that differ from one another are made to exist together in the same one molded article, by, in the molding process, adhering or joining two types of materials that have different qualities for example.

In this fuel tank structure 100, the deformation portions 104 that are formed from a rubber material are provided, and the deformation portions 104 expand and contract in directions intersecting the directions of the mountain portions 104A and the valley portions 104B. Therefore, due to the deformation portions 104 expanding and contracting following the deformation of the fuel tank 14 (see FIG. 1A), excessive stress concentrating at the fixed portions (the fused portions) of the inner wall 14B of the fuel tank 14 and the projecting portions 20D of the separator 102 can be prevented or suppressed (see FIG. 3).

A ninth embodiment of the fuel tank structure relating to the present invention is described next by using FIG. 12. Note that structural portions that are the same as those of the above-described first through eighth embodiments are denoted by the same numbers, and description thereof is omitted.

Figure 12:
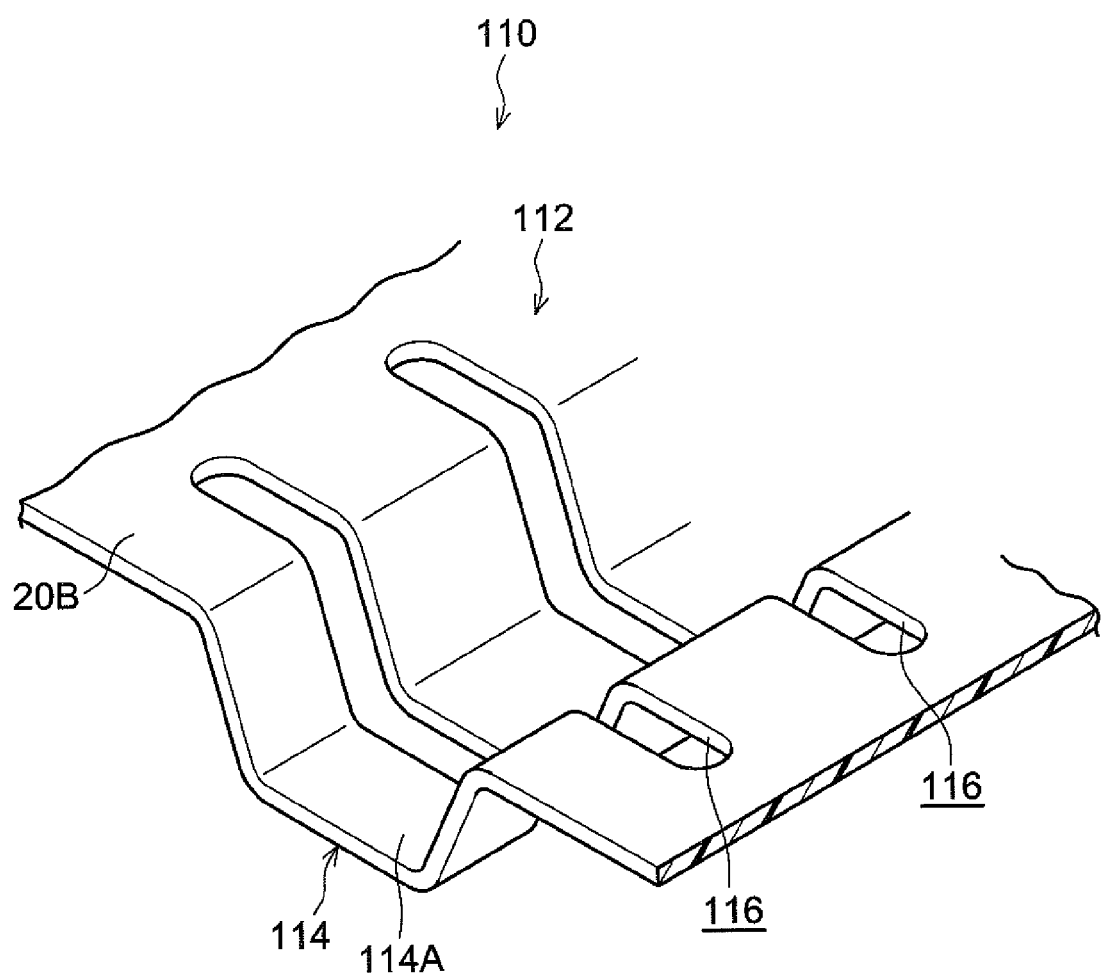
FIG. 12 is a perspective view showing a deformation portion of a separator that is used in a fuel tank structure of a ninth embodiment of the present invention.

A vicinity of a deformation portion 114 of a separator 112 that is used in a fuel tank structure 110 of the ninth embodiment is shown in FIG. 12 in a perspective view. As shown in FIG. 12, the deformation portion 114, that has a concave portion 114A that is recessed downward, is provided at the wall surface (the top surface portion 20B in FIG. 12) that serves as the general portion of the separator 112. Opening portions 116, that are shaped so as to be long in a direction intersecting the lengthwise direction of the concave portion 114A, are formed at positions extending over the top surface portion 20B and the concave portion 114A of the separator 112. The plural (e.g., two or more) opening portions 116 are formed substantially parallel to the lengthwise direction of the concave portion 114A.

In this fuel tank structure 110, the plural opening portions 116 are formed at positions extending over the top surface portion 20B and the concave portion 114A of the separator 112, and it is even easier for the deformation portions 114 to deform in directions of opening and direction of narrowing.

Figure 3:
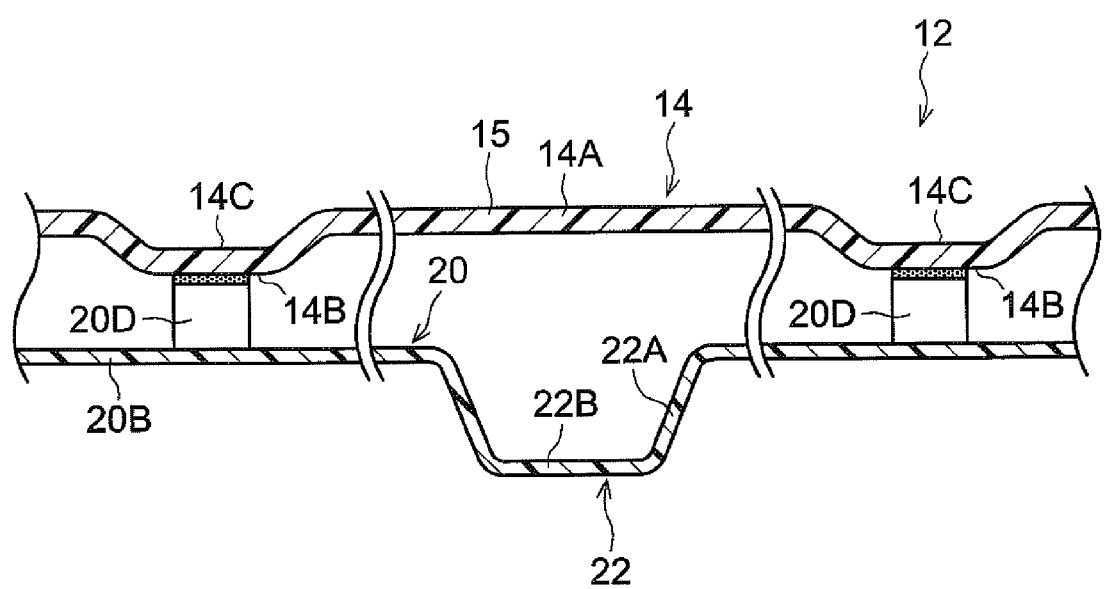
FIG. 3 is a cross-sectional view along line 3-3 in FIG. 2, and is a cross-sectional view showing a state in which projecting portions of the separator are fixed to an inner wall of the fuel tank main body.

Therefore, due to the deformation portions 114 deforming following the deformation of the fuel tank 14 (see FIG. 1A), excessive stress concentrating at the fixed portions (the fused portions) of the inner wall 14B of the fuel tank 14 and the projecting portions 20D of the separator 112 can be prevented or suppressed (see FIG. 3).

Note that, in the present embodiment, the positions, the number, the size, the length and the like of the opening portions can be changed.

The invention claimed is:

1. A fuel tank structure comprising: a fuel tank main body that accommodates fuel;
   a separator that is disposed at an interior of the fuel tank main body, and that is for reducing flow noise of the fuel;
   fixed portions that are provided at the separator, and that are fixed at two or more places to an inner wall of the fuel tank main body; and
   deformation portions that are formed between the fixed portions at the separator, and that allow deformation of the separator, wherein
   the separator is formed by locally bending a plate-shaped member, and has an outer side vertical wall portion that is disposed substantially along the vertical direction at a tank transverse direction outer side, a top surface plane that extends in a lateral direction toward a tank transverse direction inner side from an upper end portion of the outer side vertical wall portion, and an inner side vertical wall portion that extends toward a lower side from a tank transverse direction inner side end portion of the top surface plane such that the separator has a space enclosed by the outer side vertical wall portion, the top surface plane, and the inner side vertical wall portion,
   projecting portions, that serve as said fixed portions for fixing the separator to an inner wall of a top surface portion of the fuel tank, are formed at the top surface plane of the separator,
   the inner wall of the top surface portion of the fuel tank faces the top surface plane of the separator,
   the projecting portions, formed at the top surface plane of the separator, extend toward the inner wall of the top surface portion of the fuel tank so as to vertically fix to the top surface plane of the separator,
   said deformation portions that allow deformation of the separator itself are formed between the projecting portions that are adjacent to one another at the top surface plane of the separator, and
   the deformation portions are formed so as to extend over said outer side wall vertical portion, top surface plane and inner side vertical wall portion of the separator.

2. The fuel tank structure of claim 1, wherein the fixed portions are structured so as to be fixed to the inner wall of the fuel tank main body by fusing of resin.

3. The fuel tank structure of claim 1, wherein the deformation portions are formed at a wall portion of the separator, in directions that intersect lines that connect the fixed portions that are adjacent to one another.

4. The fuel tank structure of claim 1, wherein the deformation portions are made to be shapes that project-out in concave forms or convex forms from a wall surface that serves as a general portion of the separator.

5. The fuel tank structure of claim 4, wherein the deformation portions are structured by one or more concave portions and convex portions that are adjacently disposed.

6. The fuel tank structure of claim 1, wherein a plate thickness of the deformation portions is varied locally, or the deformation portions are made to be shapes in which an opening portion is provided locally.

7. The fuel tank structure of claim 1, wherein the deformation portions are formed from a rubber material.

8. The fuel tank structure of claim 1, wherein at a position where the deformation portions are provided, an opening is formed in a corner portion of the outer side vertical wall portion and the top surface plane of the separator, and in a corner portion of the top surface plane and the inner side vertical wall portion.

9. The fuel tank structure of claim 1, wherein the separator is formed in a substantially annular shape as seen in plan view, and the separator is structured such that lengths of the outer side vertical wall portion, the top surface plane, and the inner side vertical wall portion respectively differ depending on the positioning of the substantially annular shaped separator.

* * * * *